United States Patent
Ueda et al.

(10) Patent No.: US 7,344,283 B2
(45) Date of Patent: Mar. 18, 2008

(54) OPTICAL REFLECTOR AND PLANAR LIGHT SOURCE DEVICE

(75) Inventors: Takahiko Ueda, Ibaraki (JP); Hiroshi Koyama, Ibaraki (JP); Tomotsugu Takahashi, Tokyo (JP)

(73) Assignee: Yupo Corporation, Tokyo (JP)

( * ) Notice: Subject to any disclaimer, the term of this patent is extended or adjusted under 35 U.S.C. 154(b) by 0 days.

(21) Appl. No.: 11/282,658

(22) Filed: Nov. 21, 2005

(65) Prior Publication Data

US 2006/0126344 A1 Jun. 15, 2006

Related U.S. Application Data

(63) Continuation of application No. PCT/JP2004/007308, filed on May 21, 2004.

(30) Foreign Application Priority Data

May 21, 2003 (JP) ............................. 2003-142965

(51) Int. Cl.
*F21V 7/22* (2006.01)
(52) U.S. Cl. ...................... 362/341; 362/296
(58) Field of Classification Search ................ 362/341, 362/560, 516, 296, 327, 611, 600, 608, 609; 359/359, 584
See application file for complete search history.

(56) References Cited

U.S. PATENT DOCUMENTS 4,268,124 A * 5/1981 Lui ............................ 359/848
5,527,562 A * 6/1996 Balaba et al. ............. 427/430.1
6,533,440 B2 * 3/2003 Koyama et al. ............. 362/296
2002/0015299 A1 2/2002 Koyama et al. ............. 362/21
2003/0048553 A1 * 3/2003 Miwa et al. ................. 359/879

FOREIGN PATENT DOCUMENTS

| EP | 0724 181 A2 | 7/1996 |
| EP | 1 424 571 A1 * | 6/2004 |
| JP | 4-239540 | 8/1992 |
| JP | 08-262208 | 10/1996 |
| JP | 11-012377 | 1/1999 |
| JP | 2002-030169 | 1/2002 |
| JP | 2002/031704 | 1/2002 |
| JP | WO 03/014778 A1 * | 2/2003 |

OTHER PUBLICATIONS

U.S. Appl. No. 11/282,658, filed Nov. 21, 2005, Ueda et al.
U.S. Appl. No. 11/305,167, filed Dec. 19, 2005, Ueda et al.

* cited by examiner

*Primary Examiner*—Sandra O'Shea
*Assistant Examiner*—Bao Q. Truong
(74) *Attorney, Agent, or Firm*—Oblon, Spivak, McClelland, Maier & Neustadt, P.C.

(57) ABSTRACT

Disclosed is a light reflector formed of a white polyolefin film which contains a polyolefin resin and a filler and is oriented at least monoaxially to have an areal draw ratio of from 1.3 to 80 times, which has a whole ray reflectance of at least 95% and undergoes a dimensional change of at most 1.5% when left at 70° C. for 300 hours, and which has a melting-starting temperature of 70° C. or higher. The light reflector hardly causes brightness unevenness of the planar light source when it is built in a planar light source device and used for a long period of time.

20 Claims, 1 Drawing Sheet

OPTICAL REFLECTOR AND PLANAR LIGHT SOURCE DEVICE

The present application is a continuation of PCT/JP2004/007308 filed on May 21, 2004 and claims priority under 35 U.S.C. §119 of Japanese Patent Application No. 142965/2003 filed on May 21, 2003.

BACKGROUND OF THE INVENTION

1. Field of the Invention

The present invention relates to a light reflector and a planar light source device. The planar light source device comprising the light reflector of the invention is free from dimensional change of the light reflector and from brightness unevenness of the planar light source even when used for a long period of time while the light source is kept on.

2. Description of the Related Art

Backlight-type liquid-crystal displays with a built-in light source therein have been much popularized. Of such backlight-type displays, a typical structure of an underlight-type backlight comprises a housing 10 that serves both as a profile case and as a light reflector, a diffuser 14, and a light source 15 such as a cold-cathode lamp, as in FIG. 1. A typical structure of a sidelight-type backlight comprises a light waveguide with a dot print 12 on a transparent acrylic plate 13, a light reflector 11, a diffuser 14, and a light source 15 such as cold-cathode lamp, as in FIG. 2. In these, the light from the light source 15 is reflected on the light reflector 11, and forms uniform planar light though the diffuser 14. Recently, some improvements have been made in these by increasing the power of the lighting source and by increasing the number of the light source lamps therein. For increasing the brightness of these devices with upsizing of displays, plural light sources may be disposed, as in FIG. 1 and FIG. 2.

Heretofore, white polyester films have been much used for the light reflector for backlights (e.g., JP-A 4-239540). Recently, however, a light reflector comprising a white polyolefin film that may be lightweight and is flexible has been proposed (e.g., JP-A 8-262208, 2002-31704).

However, when a light reflector comprising such a white polyolefin film is built in a planar light source device and when it is used for a long period of time while the light source is kept on, then the brightness of the planar light source may be uneven.

SUMMARY OF THE INVENTION

An object of the invention is to provide a light reflector which, when built in a planar light source device and even when used for a long period of time, hardly causes brightness unevenness of the planar light source. Another object is to provide a planar light source device which hardly causes brightness unevenness of the planar light source even when used for a long period of time.

We, the present inventors have assiduously studied and, as a result, have realized the intended light reflector by controlling the dimensional change and the melting-starting temperature of a white polyolefin film having pores inside it, within specific ranges.

Specifically, the invention provides a light reflector formed of a white polyolefin film which contains a polyolefin resin and a filler and is oriented at least monoaxially to have an areal draw ratio of from 1.3 to 80 times, which has a whole ray reflectance of at least 95% and undergoes a dimensional change of at most 1.5% when left at 70° C. for 300 hours, and which has a melting-starting temperature of 70° C. or higher.

The white polyolefin film to form the light reflector of the invention is preferably heat-treated at 50° C. to 150° C. to have a Clark degree of at least 85. Also preferably, the filler content of the white polyolefin film is from 5% to 75% by weight, and the filler is selected from a group consisting of an inorganic filler having a mean particle size of from 0.05 to 1.5 μm and an organic filler having a mean dispersed particle size of from 0.05 to 1.5 μm.

Also preferably, the porosity, calculated according to the following formula (1), of the white polyolefin film of the invention falls between 15% and 60%.

$$\text{Porosity (\%)} = [(\rho 0 - \rho)/\rho 0] \times 100 \tag{1}$$

wherein ρ0 indicates the true density of the film, and ρ indicates the density thereof.

The invention also provides a planar light source device equipped with the light reflector as above. The planar light source device of the invention is characterized in that it is free from uneven brightness of the planar light source even when used for 300 hours while the light source therein is kept on.

When built in appliances along with a planar light source device comprising it and even when used for a long period of time in a high-temperature atmosphere, the light reflector of the invention undergoes few changes in the dimension, the color and the shape thereof. Accordingly, using the light reflector of the invention provides planar light source devices that are free from troubles of color change and uneven brightness. In addition, using the planar light source device enables good maintenance of the image quality and the brightness of, for example, liquid-crystal displays for a long period of time.

Figure 1:
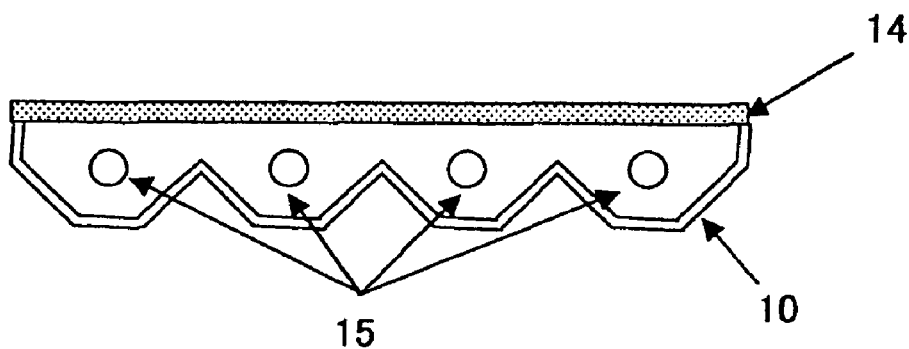
FIG. 1 is a cross-sectional view showing a typical structure of an underlight-type backlight.

In the drawings, 10 is a housing, 12 is a white dot print for reflection, 13 is an acrylic plate (light waveguide), 14 is a diffuser sheet, 15 is a cathode-ray lamp (light source), 21 is a protective layer, 22 is a white polyolefin film, and 23 is a protective layer.

BEST MODE FOR CARRYING OUT THE INVENTION

The constitutions and the advantages of the light reflector and the planar light source device of the invention are described in detail hereinunder. In this description, the numerical range expressed by the wording "a number to another number" means the range that falls between the former number indicating the lowermost limit of the range and the latter number indicating the uppermost limit thereof.

Polyolefin Resin

The light reflector of the invention is formed of a polyolefin film that contains a polyolefin resin and a filler. The type of the polyolefin resin for the light reflector of the invention is not specifically defined. For example, it includes ethylenic resins such as high-density polyethylene, middle-density polyethylene; and propylenic resins. Two or more of these may be combined for use herein. Of those polyolefin resins, preferred are propylenic resins in view of the chemical resistance and the shapability thereof.

The propylenic resins include propylene homopolymers, and propylene-based copolymers with α-olefin such as ethylene, 1-butene, 1-hexene, 1-heptene, 4-methyl-1-pentene or the like. The stereospecificity of the resins for use herein is not specifically defined. The resins may be isotactic or syndiotactic, and may have any desired degree of stereospecificity. The copolymers may be binary, ternary or quaternary ones, and may be random copolymers or block copolymers.

Preferably, the content of the polyolefin resin of the type in the white polyolefin film is from 25% to 95% by weight, more preferably from 30% to 90% by weight of the film. The polyolefin resin content of at least 25% by weight may prevent surface scratches in stretching and forming the white polyolefin film mentioned below, and the polyolefin resin content of at most 95% by weight may readily provide a satisfactory degree of porosity of the film.

Filler

For the filler to be in the white polyolefin film of the invention along with the polyolefin resin therein, usable are various inorganic fillers or organic fillers.

The inorganic filler includes calcium carbonate, calcined clay, silica, diatomaceous earth, talc, titanium oxide, barium sulfate, alumina. Of those, preferred are calcium carbonate, titanium oxide and barium sulfate.

The organic filler has a melting point or a glass transition point (for example, falling between 120 and 300° C.) higher than the melting point or the glass transition point of the polyolefin resin to be used for the film, and it includes polyethylene terephthalate, polybutylene terephthalate, polycarbonate, nylon-6, nylon-6, 6, cyclic olefin homopolymer, and cyclic olefin copolymer (COC) with ethylene or the like.

Either singly or as combined, one or more selected from the above-mentioned inorganic fillers and organic fillers may be in the film of the invention. When two or more are selected and combined to be in the film, the organic filler and the inorganic filler may be mixed.

For suitably controlling the size of the pores to be formed in the oriented white polyolefin film that is mentioned below, it is desirable that the mean particle size of the inorganic filler or the mean dispersed particle size of the organic filler to be in the film is from 0.05 to 1.5 µm, more preferably from 0.1 to 1 µm. If the mean particle size or the mean dispersed particle size is 1.5 µm or less, then uniform pores will be easy to form in the film. In addition, if the mean particle size or the mean dispersed particle size is 0.05 µm or more, then effective pores will be easy to form in the film.

The filler effective for forming such preferred pores in the film does not contain particles having, for example, a specific surface area of 20,000 cm²/g or more and a particle size of 10 µm or more (measured with a laser diffractometric particle sizer, "Microtrack").

For suitably controlling the amount of the pores to be formed in the oriented white polyolefin film mentioned below, the filler content of the oriented film is preferably from 5% to 75% by weight, more preferably from 10% to 70% by weight. The filler content of at least 5% by weight may readily provide a satisfactory degree of porosity of the film, and the filler content of at most 75% by weight may prevent surface scratches in the film.

The white polyolefin film for use in the invention may have a single-layered or multi-layered structure, but preferably has a multi-layered structure in view of the latitude in compounding the ingredients of forming the film. For example, the film may have a three-layered structure of surface layer/substrate layer/back layer. When the essential resin to form the substrate layer in this structure is a propylenic resin, then it may be combined with from 3% to 25% by weight of an additional resin having a lower melting point than the propylenic resin, such as polyethylene or ethylene/vinyl acetate.

The thickness of the surface and back layers may be 0.1 µm or more, preferably from 0.1 µm to less than 20 µm, and may be less than 25%, preferably from 1% to 20% of the overall thickness of the white polyolefin film. The overall thickness of the white polyolefin film is preferably from 30 to 1000 µm, more preferably from 40 to 400 µm, even more preferably from 50 to 300 µm.

Additive

If desired, the white polyolefin film of the invention may contain fluorescent brightener, stabilizer, light stabilizer, dispersant, lubricant. The stabilizer may be a steric-hindered phenol-type, or phosphorus-containing, or amine-type stabilizer, and its content may be from 0.001% to 1% by weight. The light stabilizer may be a steric-hindered amine-type, or benzotriazole-type, or benzophenone-type light stabilizer, and its content may be from 0.001% to 1% by weight. The inorganic filler dispersant may be a silane-coupling agent, a higher fatty acid such as oleic acid or stearic acid, metal soap, polyacrylic acid, polymethacrylic acid or their salt, and its content may be from 0.01% to 4% by weight.

Shaping

For shaping the white polyolefin film, employable is any ordinary monoaxially-stretching or biaxially-stretching method. Concretely, herein employable is a monoaxial-stretching method that comprises sheetwise extruding resin melt (s) through a single-layer or multi-layer T-die or I-die connected to a screw extruder, and then monoaxially stretching the resulting sheet in a mode of machine-direction stretching to be attained by utilizing the peripheral speed difference between multiple rolls; or a biaxial-stretching method that comprises a combination of the same step as in the monoaxial-stretching method and an additional step of cross-direction stretching to be attained in a tenter oven; or a simultaneous biaxial-stretching method to be attained by a combination of a tenter oven and a linear motor.

The stretching temperature is lower by 2 to 60° C. than the melting point of the polyolefin resin used, but is higher by 2 to 60° C. than the glass transition point of the resin. When the resin is propylene homopolymer (melting point, 155 to 167° C.), then the stretching temperature preferably falls between 95 and 165° C. The pulling rate for the stretching preferably falls between 20 and 350 m/min.

For suitably controlling the size of the pores to be formed in the white polyolefin film, the areal draw ratio of the film preferably falls between 1.3 and 80 times, more preferably between 1.5 and 70 times, even more preferably between 22 and 65 times.

The areal draw ratio falling between 1.3 and 80 times readily forms fine pores in the film, not lowering the reflectance of the film.

For suitably controlling the amount of the pores to be formed in the white olefin film of the invention, per the unit volume of the film, the degree of porosity of the film is preferably from 15% to 70%, more preferably from 20% to 55%.

The "porosity" as referred to herein is meant to indicate the value calculated according to the above-mentioned formula (1). In formula (1), pρ indicates the true density of the film, and ρ indicates the density thereof (JIS P-8118).

So far as the non-stretched material does not contain much air, the true density is nearly equal to the density of the non-stretched film.

The density of the white polyolefin film for use in the invention generally falls between 0.5 and 1.2 g/cm³. Films having more pores have a smaller density and have a larger porosity. Films having a larger porosity may have improved surface-reflecting characteristics.

Protective Layer

Thus obtained, the white polyolefin film may be directly used for a light reflector as it is. However, for preventing the film from being scratched or soiled while it is shaped, processed or used, and for preventing it from being aged and deteriorated, a protective layer may be formed on the surface and the back face of the white polyolefin film not detracting from the optical characteristics of the light reflector that is formed of the film. The protective layer may be formed on one or both faces of the white polyolefin film.

The protective layer may be formed as follows: A molten material for the protective layer is co-extruded through a multi-layer T-die or I-die onto the white polyolefin film before it is shaped and stretched, and the resulting laminate is stretched and shaped. When the white polyolefin film is biaxially oriented, a protective layer may be formed thereon as follows: The film is first monoaxially stretched, and then a molten material for the protective layer is extruded onto it and laminated thereon, and the resulting laminate is monoaxially stretched. Apart from the above, a coating material for the protective layer may be directly or indirectly applied onto the biaxially-oriented film, and then dried and cured thereon to form the intended protective layer.

For the protective layer that is biaxially or monoaxially stretched and formed along with the formation of the biaxially-stretched base film, the same polyolefin resin and filler as those for the white polyolefin film may be used. Regarding the proportion of the ingredients, the polyolefin resin content is preferably from 55% to 100% by weight with a filler content of from 0% to 45% by weight; more preferably the polyolefin resin content is from 70% to 100% by weight with a filler content of from 0% to 30% by weight; even more preferably the polyolefin resin content is from 90% to 100% by weight with a filler content of from 0% to 10% by weight; still more preferably the polyolefin resin content is from 95% to 100% by weight with a filler content of from 0% to 5% by weight. The above-mentioned additives may also be in the protective layer.

For the protective layer that is to be formed on the already-oriented film by applying a coating composition onto it, employable is a silicone-type or fluorine-containing material. The protective layer of the type may be further formed on the oriented film that has a protective layer formed in shaping the film.

For forming the layer, usable is any of a roll coater, a blade coater, a bar coater, an air knife coater, a size-press coater, a gravure coater, a reverse coater, a die coater, a lip coater, a spray coater. If desired, the coated film may be smoothed or may be dried to remove the excess water and hydrophilic solvent, or may be cured through exposure to heat, light or electronic rays to thereby form the protective layer.

So as not to detract from the optical characteristics of the light reflector formed of the film, the thickness of the protective layer to be formed on the film is preferably from 0.2 to 80 μm on one side of the film, more preferably from 1 to 60 μm.

Heat Treatment

Preferably, the white polyolefin film of the invention is heat-treated at a temperature falling between 50° C. and 150° C., more preferably between 70° C. and 120° C. The heating temperature of 50° C. or higher is effective for preventing dimensional change of the film with time; and the heating temperature of 150° C. or lower is effective for preventing film curling that may cause brightness reduction or uneven brightness, and for preventing film reflectance reduction.

The time for heat treatment preferably falls between 0.1 and 168 hours, more preferably between 2 and 72 hours. The heating time of 0.1 hours or more may be effective for preventing dimensional change of the film with time; and the heating time of 168 hours or less will not too much lower the producibility.

For heat treatment of the film, for example, employable is a method of processing sheets or rolls in an oven, or a method of heating them with a heat medium such as high-temperature air, steam or the like. Regarding the condition of the film in heat treatment thereof, the ends of the film are not restrained so that the film may gradually shrink while heated; or when the ends of the film are fixed, the distance between the opposite two ends of the film or that between the opposite two pairs of fixers at the two ends of the film is allowed to reduce in accordance with the thermal shrinkage of the film; or at least the opposite two ends of the film are fixed so that they do not follow the shrinkage of the film. For the heat treatment of the film, concretely mentioned are a method of heating rolls of the film in an air oven; a method of heating one or more sheets of the film either singly or in piles; and a method of heating the film by contacting it with at least one high-temperature roll.

Characteristics of Light Reflector

Preferably, the whole ray reflectance of the light reflector of the invention is at least 95%. The whole ray reflectance as referred to herein is meant to indicate a mean value of the reflectance measured at different wavelengths falling within a wavelength range of from 400 nm to 700 nm, according to the method described in JIS-Z8701. If the whole ray reflectance thereof is lower than 95%, then it is unfavorable since the brightness of the displays that comprise the light reflector is low.

When left at 70° C. for 300 hours, the dimensional change of the light reflector of the invention is preferably at most 1.5%, more preferably at most 0.5%, even more preferably at most 0.2%. If the dimensional change is over 1.5%, then it is unfavorable since the dimension of the film will too much change with time, therefore causing brightness reduction and uneven brightness. The dimensional change may be determined according to the method described in Test Example 1 mentioned hereunder. When any of the MD (machine-direction) dimensional change (%) or the TD (transverse-direction) dimensional change (%) is more than 1.5%, then it is unfavorable to the light reflector of the invention.

The melting-starting temperature ($T_{m0}$) of the light reflector of the invention is 70° C. or higher, preferably from 80° C. to 160° C. If the melting-starting temperature thereof is lower than 70° C., then it is unfavorable since the dimensional change of the film with time is great therefore causing brightness reduction and uneven brightness. The melting-starting temperature may be determined according to the method described in Test Example 1 mentioned hereunder.

Preferably, the Clark degree of the light reflector of the invention is at least 85, more preferably at least 90. The Clark degree as referred to herein is meant to indicate the S value determined according to the method described in JIS-P8143. The film having a Clark degree of at least 85 is hardly deformed during its use, and therefore this may more effectively prevent uneven brightness in the plane direction of the planar light source that comprises the film.

The shape of the light reflector of the invention is not specifically defined, and may be suitably determined in accordance with the use, the object and the service condition thereof. In general, it is used as a plate or film, but may be used in any other form capable of serving as a light reflector, and any and every form that serves as a light reflector falls within the scope of the invention.

Planar Light Source Device

Figure 2:
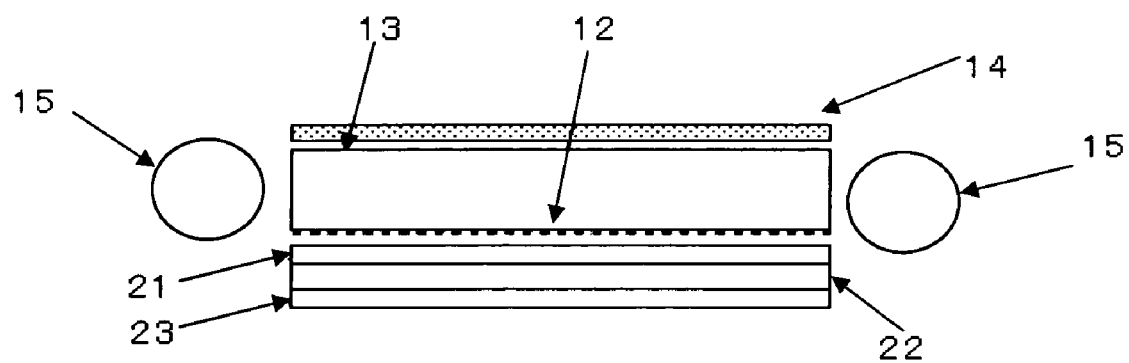
FIG. 2 is a cross-sectional view showing a typical structure of a sidelight-type backlight.

The light reflector of the invention may be built in a planar light source device. The concrete structure of the planar light source device of the invention is not specifically defined. One typical structure of the planar light source device comprises at least a light source, a light waveguide and a light reflector, and preferably has a diffuser sheet. For example, there are mentioned an underlight-type backlight as in FIG. 1, and a sidelight-type backlight as in FIG. 2. In particular, the light reflector of the invention is extremely useful as that for constituting a sidelight-type backlight. In the sidelight-type backlight that comprises the light reflector of the invention, the light having passed through the light waveguide may be uniformly reflected by the light reflector therein with no trouble of uneven brightness in the plane direction of the device. Accordingly, the backlight device of the type gives light of a natural feel to viewers.

Even when the planar light source device comprising the light reflector of the invention is used for 300 hours while the light source is kept on, the light reflector therein does not almost undergo dimensional change and deformation owing to the heat from the light source. Therefore, the device is characterized in that the planar light source therein is free from a trouble of uneven brightness.

The planar light source device of the invention may be effectively disposed in liquid-crystal displays, etc. When used in liquid-crystal displays, it ensures good image quality and brightness for a long period of time.

Other Applications

The light reflector of the invention may be used not only in such planar light source devices as above but also in any other power-saving display devices which are not equipped with a built-in light source and in which room light is intended to reflect on the light reflector. In addition, it may be widely utilized for the back of indoor or outdoor lighting devices and for the back of decorative illumination signboards.

The invention is described more concretely with reference to the following Examples, Comparative Examples and Test Examples. The material, its amount and ratio and the operation mentioned below may be suitably changed and modified not overstepping the spirit and the scope of the invention. Accordingly, the scope of the invention should not be limited to the Examples mentioned below. The materials used in the Examples are shown in Table 1 mentioned below.

PRODUCTION EXAMPLE 1

A composition (B) prepared by mixing PP1, HDPE and filler in a ratio as in Table 2, and compositions (A) and (C) each prepared by mixing PP2 and filler in a ratio as in Table 2 were separately melt-kneaded in three extruders at 250° C. Next, the resulting melts were fed into one co-extrusion die in which protective layers (A) and (C) were laminated on both faces of a substrate layer (B), and sheetwise extruded out, and then cooled to about 60° C. with a chill roll to obtain a laminate.

The laminate was re-heated at 145° C., then stretched in the machine direction thereof to a draw ratio as in Table 2 by utilizing the peripheral speed difference between a number of rolls, again re-heated up to about 150° C., and stretched in the transverse direction thereof in a tenter to a draw ratio as in Table 2. Next, this was annealed at 160° C. and then cooled to 60° C., and its edges were trimmed away to give a three-layered white polyolefin film having a thickness as in Table 2.

PRODUCTION EXAMPLE 2

A composition (B) prepared by mixing PP1, HDPE and filler in a ratio as in Table 2 was melt-kneaded at 250° C. in an extruder. Next, this was sheetwise extruded out, and then cooled to about 60° C. with a chill roll to prepare a substrate layer (B). The substrate layer (B) was re-heated at 145° C., and stretched in the machine direction thereof to a draw ratio as in Table 2 by utilizing the peripheral speed difference between a number of rolls.

Compositions (A) and (C) each prepared by mixing PP2 and HDPE in a ratio as in Table 2 were separately melt-kneaded, and melt-extruded out onto both faces of the substrate layer (B) to laminate protective layers (A) and (C) thereon. Then, the laminate was re-heated at 160° C., and stretched in the transverse direction thereof in a tenter to a draw ratio as in Table 2. Next, this was annealed at 160° C. and then cooled to 60° C., and its edges were trimmed away to give a three-layered white polyolefin film having a thickness as in Table 2.

PRODUCTION EXAMPLE 3

A composition (B) prepared by mixing PP1 and filler in a ratio as in Table 2, and compositions (A) and (C) each prepared by mixing PP2 and filler in a ratio as in Table 2 were separately melt-kneaded in three extruders at 250° C. Next, the resulting melts were fed into one co-extrusion die in which protective layers (A) and (C) were laminated on both faces of a substrate layer (B), and sheetwise extruded out, and then cooled to about 60° C. with a chill roll to obtain a laminate.

The laminate was re-heated at 145° C., then stretched in the machine direction thereof to a draw ratio as in Table 2 by utilizing the peripheral speed difference between a number of rolls, again re-heated up to about 150° C., and stretched in the transverse direction thereof in a tenter to a draw ratio as in Table 2. Next, this was annealed at 160° C. and then cooled to 60° C., and its edges were trimmed away to give a three-layered white polyolefin film having a thickness as in Table 2.

PRODUCTION EXAMPLE 4

A white polyolefin film was produced in the same manner as in Production Example 1, which, however, did not undergo annealing at 160° C.

EXAMPLES 1 TO 5

The white polyolefin films obtained in Production Examples 1 to 3 were separately rolled up, and the rolls were put in an air oven, in which they were heated at a temperature indicated in Table 3 for a period of time also indicated in Table 3. Thus processed, the films are light reflectors. The white polyolefin films used in the Examples are those produced in the Production Examples as in Table 3.

COMPARATIVE EXAMPLES 1 AND 2

The white polyolefin films obtained in Production Examples 1 and 4 are light reflectors of Comparative Examples 1 and 2, respectively.

TEST EXAMPLE 1

The light reflectors of Examples 1 to 5 and Comparative Examples 1 and 2 were tested and evaluated in point of the whole ray reflectance, the porosity, the Clark degree, the melting-starting temperature, the dimensional change and the brightness fluctuation. The results are given in Table 2 and Table 3.

The whole ray reflectance is measured according to JIS Z-8701, and this is in terms of the mean reflectance of light falling within a wavelength range of from 400 nm to 700 nm.

The porosity is derived from the density $\rho$ and the true density $\rho 0$ of the film measured according to JIS P-8118, in accordance with formula (1).

The Clark degree is measured both in the machine direction (MD) and in the transverse direction (TD), according to JIS-P8143.

The melting-starting temperature ($T_{m0}$) is measured as follows: 3 mg of a sample to be analyzed is put into a DSC pan, this is set in a scanning calorimeter (Seiko Instruments' DSC6200) and heated from 30° C. up to 240° C. at a heating rate of 20° C./min to draw a DSC curve of the sample. The temperature at which the DSC curve begins to shift from the base line toward the endothermic side is read, and this is the melting-starting temperature ($T_{m0}$) of the sample analyzed.

The dimensional change is determined as follows: The dimension in the machine direction of a 18-inch size light reflector, $L_{M0}$ (mm), and the dimension in the transverse direction thereof, $L_{T0}$ (mm), are measured. Not strained at their edges, the film is kept in an oven at 70° C. for 300 hours, and the MD dimension $L_{M1}$ (mm) and the TD dimension $L_{T1}$ (mm) thereof are measured. The dimensional change is derived from the data according to the following formulae:

MD dimensional change (%)=|{($L_{M1}-L_{M0}$)×100/$L_{M0}$}|

TD dimensional change (%)=|{($L_{T1}-L_{T0}$)×100/$L_{T0}$}|

The brightness stability of planar light source devices is evaluated as follows: Each light reflector obtained in Examples 1 to 5 and Comparative Examples 1 and 2 is set in a 18-inch size backlight unit (as in FIG. 2), an acrylic plate (light waveguide plate) with white dots printed thereon is put on it, and cold-cathode lamps (Harrison's Inverter Unit, 12 V, 6 mA tube current) are fitted to both edges of the plate to fabricate a planar light source device. The light source in the device is turned on, and the device is kept vertically stood. After 300 hours, the device is visually observed as to the brightness fluctuation in the plane direction thereof.

O: The brightness is uniform with no unevenness.

x: The brightness is uneven, and the device is problematic for its practical use.

TABLE 1

| Ingredient | Details |
|---|---|
| PP1 | propylene homopolymer [Nippon Polychem's Novatec PP: EA8] (MFR (230° C., 2.16 kg load) = 0.8 g/10 min), melting point (167° C., DSC peak temperature) |
| PP2 | propylene homopolymer [Nippon Polychem's Novatec PP: MA4] (MFR (230° C., 2.16 kg load) = 5 g/10 min), melting point (167° C., DSC peak temperature) |
| HDPE | high-density polyethylene [Nippon Polychem's Novatec HD: HJ360] (MFR (190° C., 2.16 kg load) = 5.5 g/10 min), melting point (134° C., DSC peak temperature) |
| Filler 1 | heavy calcium carbonate having a mean particle size of 0.97 μm [Maruo Calcium's Caltex 7] |
| Filler 2 | titanium dioxide having a mean particle size of 0.2 μm [Ishihara Sangyo's CR-60] |

TABLE 2

| | Composition (wt. %) of Protective Layer (A) | | | | Composition (wt. %) of Substrate Layer (B) | | | | Composition (wt. %) of Protective Layer (C) | | | | Draw Ratio | | Aerial Draw Ratio MD × CD | Layer Thickness A/B/C (μm) |
|---|---|---|---|---|---|---|---|---|---|---|---|---|---|---|---|---|
| | PP2 | HDPE | Filler 1 | Filler 2 | PP1 | HDPE | Filler 1 | Filler 2 | PP2 | HDPE | Filler 1 | Filler 2 | MD (machine direction) | CD (cross direction) | | |
| Production Examples 1, 4 | 70 | — | 29.5 | 0.5 | 54 | 10 | 30 | 6 | 70 | — | 29.5 | 0.5 | 3.8 | 8.2 | 31.2 | 0.5/169/0.5 |
| Production Example 2 | 90 | — | 9.5 | 0.5 | 61 | 4 | 30 | 5 | 90 | — | 9.5 | 0.5 | 4.5 | 8.5 | 38.3 | 14/172/14 |
| Production Example 3 | 97 | — | 2.5 | 0.5 | 65 | — | 30 | 5 | 97 | — | 2.5 | 0.5 | 4 | 8.5 | 34.0 | 1/186/1 |

TABLE 3

| | | Condition for Heat Treatment | | Test Results | | | | | Dimensional Change (70° C., 300 hours) | | Brightness Unevenness |
|---|---|---|---|---|---|---|---|---|---|---|---|
| | Production Example | Heat Treatment Temperature (° C.) | Heat Treatment Time (hr) | Whole Ray Reflectance (%) | Porosity (%) | Clark Degree MD | Clark Degree TD | Melting-Starting Temperature $T_{m0}$ (° C.) | MD (%) | TD (%) | visual check |
| Example 1 | 1 | 70 | 48 | 96.0 | 43 | 95 | 200 | 98 | 0.10 | 0.07 | ○ |
| Example 2 | 2 | 70 | 1 | 97.1 | 50 | 145 | 300 | 100 | 0.31 | 0.20 | ○ |
| Example 3 | 2 | 90 | 24 | 97.1 | 50 | 145 | 300 | 103 | 0.05 | 0.02 | ○ |
| Example 4 | 2 | 100 | 20 | 97.1 | 50 | 145 | 300 | 105 | 0.04 | 0.02 | ○ |
| Example 5 | 3 | 90 | 24 | 97.4 | 54 | 120 | 205 | 105 | 0.03 | 0.03 | ○ |
| Comparative Example 1 | 1 | — | — | 96.0 | 43 | 95 | 200 | 65 | 1.61 | 1.20 | x |
| Comparative Example 2 | 4 | — | — | 96.0 | 43 | 95 | 200 | 60 | 2.40 | 4.10 | x |

INDUSTRIAL APPLICABILITY

When built in appliances along with a planar light source device comprising it and even when used for a long period of time in a high-temperature atmosphere, the light reflector of the invention undergoes few changes in the dimension, the color and the shape thereof. Accordingly, using the light reflector of the invention provides planar light source devices that are free from troubles of color change and uneven brightness. In addition, using the planar light source device enables good maintenance of the image quality and the brightness of, for example, liquid-crystal displays for a long period of time. Accordingly, the industrial applicability of the light reflector and the planar light source device of the invention is extremely great.

The present disclosure relates to the subject matter contained in PCT/JP2004/007308 filed on May 21, 2004, which is expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A light reflector comprising:
a white polyolefin film comprising a polyolefin resin and a filler, the white polyolefin film being oriented at least monoaxially to have an areal draw ratio of from 1.3 to 80 times, having a whole ray reflectance of at least 95%, undergoing a dimensional change of at most 1.5% when left at 70° C. for 300 hours, and having a melting-starting temperature of 70° C. or higher.

2. A light reflector comprising:
a white polyolefin film; and
a protective layer provided on one or both faces thereof,
Wherein the white polyolefin film comprises a polyolefin resin and a filler, is oriented at least monoaxially to have an areal draw ratio of from 1.3 to 80 times, has a whole ray reflectance of at least 95%, undergoes a dimensional change of at most 1.5% when left at 70° C. for 300 hours, and has a melting-starting temperature of 70° C. or higher.

3. The light reflector as claimed in claim 2, wherein the protective layer is formed on both faces of the white polyolefin film.

4. The light reflector as claimed in claim 2, wherein the protective layer contains from 55% to 100% by weight of a polyolefin resin and from 0% to 45% by weight of a filler.

5. The light reflector as claimed in claim 2, wherein the protective layer contains from 70% to 100% by weight of a polyolefin resin and from 0% to 30% by weight of a filler.

6. The light reflector as claimed in claim 2, wherein the thickness of the protective layer is from 0.2 to 80 μm.

7. The light reflector as claimed in claim 1, wherein the thickness of the white polyolefin film is from 30 to 1000 μm.

8. The light reflector as claimed in claim 1, wherein the white polyolefin film is heat-treated at 50° C. to 150° C.

9. The light reflector as claimed in claim 8, wherein the white polyolefin film is heat-treated for 0.1 to 168 hours.

10. The light reflector as claimed in claim 8, wherein the white polyolefin film is heat-treated for 2 to 72 hours.

11. The light reflector as claimed in claim 1, wherein the polyolefin resin is a propylenic resin.

12. The light reflector as claimed in claim 1, which has an areal draw ratio of from 22 to 65 times.

13. The light reflector as claimed in claim 1, which has a dimensional change of at most 0.2% when left at 70° C. for 300 hours.

14. The light reflector as claimed in claim 1, which has a melting-starting temperature of from 80 to 160° C.

15. The light reflector as claimed in claim 1, which has a Clark degree of at least 85.

16. The light reflector as claimed in claim 1, wherein the filler content of the white polyolefin film is from 5% to 75% by weight.

17. The light reflector as claimed in claim 16, wherein the filler is selected from a group consisting of an inorganic filler having a mean particle size of from 0.05 to 1.5 μm and an organic filler having a mean dispersed particle size of from 0.05 to 1.5 μm.

18. The light reflector as claimed in claim 1, wherein the white polyolefin film has a porosity, calculated according to formula (1), of from 15% to 60%:

$$\text{Porosity (\%)} = [(\rho 0 - \rho)/\rho 0] \times 100 \quad (1)$$

wherein ρ0 indicates the true density of the film, and ρ indicates the density thereof.

19. A planar light source device equipped with the light reflector of claim 1.

20. The planar light source device as claimed in claim 19, which is free from uneven brightness of the planar light source even when used for 300 hours while the light source therein is kept on.

* * * * *